Sept. 26, 1961 E. W. SONNER, JR 3,001,320
FISH HOOK EXTRACTOR
Filed June 9, 1958
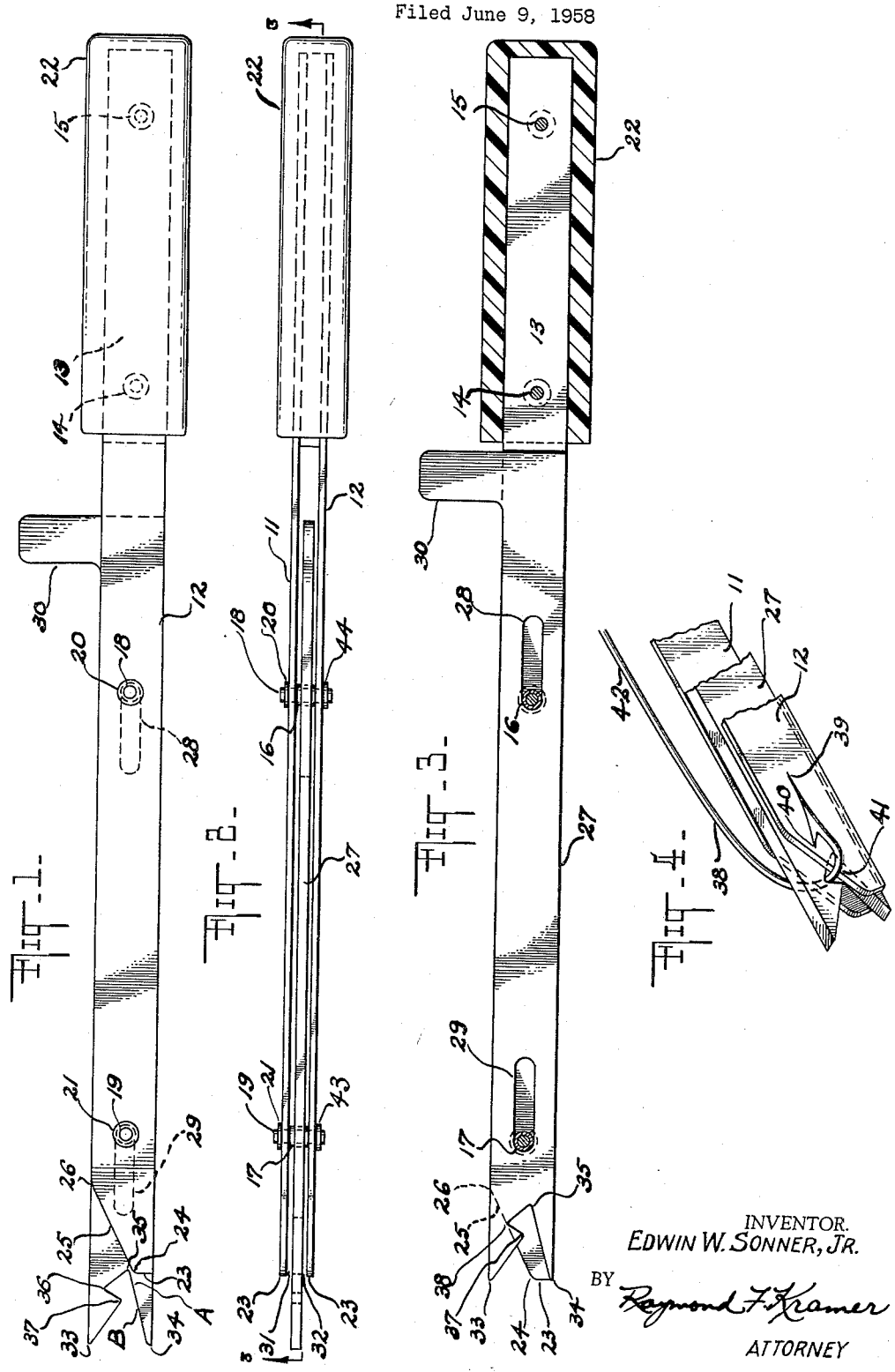
INVENTOR.
EDWIN W. SONNER, JR.
BY Raymond F. Kramer
ATTORNEY

3,001,320
FISH HOOK EXTRACTOR
Edwin W. Sonner, Jr., 91—19 Hollis Court Blvd.,
Queens Village, N.Y.
Filed June 9, 1958, Ser. No. 740,663
4 Claims. (Cl. 43—53.5)

This invention is of an improved device for aiding in the extraction from a caught fish of a fish hook lodged in its mouth, throat or stomach. More particularly, the invented device is adapted to find the fish hook, orient it with respect to the extractor, hold it tightly to the extractor and release it from the fish, in a sequence of simple operations carried out with the use of only one of the operator's hands, leaving the other free to pin or hold the fish or perform other necessary tasks.

The improved fish hook extractors of this invention are intended primarily to be used by sports fishermen but will prove also to be extremely helpful to the commercial fishermen employing hook and line. As is well-known to fishermen certain fish have a stronger tendency than others to swallow the hook and in some the hook is often found embedded in bony structure from which removal by shaking, pulling, twisting and other hand techniques is well-nigh impossible. When the hook has been swallowed and is deep in the fish's throat or stomach, it is often impossible to reach it with the hand to allow manipulations which might work it loose. Even when the hook can easily be reached by the fingers there is the ever-present danger of being bitten by the fish or cutting the fingers when accidentally contacting the teeth during working of the hook. Although it is often possible to remove the hook by cutting with a knife the part of the fish holding the hook such an extreme measure usually results in the death of the fish and the presence of gore on the boat and other objects contacting the fish. It also offends the sensibilities of many fishermen to wield the knife on a live fish. By use of the invented fish hook disgorger the hook can be removed with a minimum of difficulty and the fish can usually be recovered with only slight injury, so that it can be gill-strung and kept alive in the water for several hours, resulting in a fresher catch, or, alternatively, so that it can be released with a good chance of survival.

In accordance with the present invention there is provided a fish hook extractor comprising a pair of opposed flat elongated external members and an elongated flat internal member held between the external members in reciprocably and longitudinally slidable relationship therewith, the internal member having at its end a notch opening extending from the sides of the internal member at the end thereof inwardly to a point of joinder, and, spaced inwardly from the end of the internal member and extending sidewardly, another notch in the side of the first opening, and the external members being tapered from the end thereof toward the side in greater proximity to the side of the internal member notch opening which is itself notched, so that when the external members are moved forward relative to the internal member, tapered end first, the bight of a fish hook in the joinder of the sides of the first notch opening will be forced by the tapered external member into the other, sidewardly extending notch where it will be held tightly between the tapered external members and the wall of the sidewardly extending notch.

With the above description and the foregoing objects and functions in mind the invention may be considered as comprising the fish hook extractor illustrated in the drawing subsequently described, together with modifications and variations thereof that will be apparent to one skilled in the art to which the invention pertains.

The advantages of the present invention, as well as other objects thereof, will be apparent from the following description taken in conjunction with the accompanying drawing in which:

FIG. 1 is a side elevation of the fish hook extractor with the hook-grasping parts in open position;

FIG. 2 is a top plan view of the extractor, also shown in the open position, as in FIG. 1;

FIG. 3 is a longitudinal section of the fish hook extractor along cutting plane 3—3 but showing the extractor in closed position; and FIG. 4 is an isometric view of the end of the extractor in gripping engagement with a fish hook.

Referring now in detail to the drawing the numeral 11 represents a thin flat elongated external member situated in opposed relationship with its twin member 12. Flat bracing strip 13 and members 11 and 12 are pierced at the handle end by rivets or other fastening devices 14 and 15 which hold the external members firmly together with the brace in between. At suitable points along the axis of the extractor spacers 16 and 17 between the external members hold them apart a desired distance. Spacers 16 and 17 are fixed in place by rivets 18 and 19 and washers 20, 21, 43 and 44. About the handle end and covering the elongated members, bracer and rivets is wrapped or molded or fitted a suitable rubber or plastic material to make a suitable, satisfactory handgrip 22.

At the end of the external members remote from the handle portion both external members are tapered for a purpose which shall be explained later. End 23 runs a short distance at about a right angle to the side of the external members and at 24 is rounded starting taper 25 which terminates at 26 on the side of the external member.

Held between the two external members 11 and 12 is a longitudinally slidable longitudinal thin flat internal member 27 containing relatively short longitudinally disposed slots 28 and 29 through which pass rivets 18 and 19 and spacers 16 and 17 respectively, the riveted spacers serving as stops limiting the reciprocable movements of the internal member. Near the handle end of the extractor the internal member contains an extension 30 adapted for finger or thumb engagement to move the internal member forward or backward as necessary. The external members allow the internal member to move without binding because brace 13 and spacers 16 and 17 are of thickness slightly greater than that of the flat internal member 27, resulting in clearances 31 and 32, exaggerated in the drawing for clarity of exposition.

At the end of the internal member remote from the handle is provided an opening of novel structure, the sides of which, in cooperation with the taper of the external members, hold a fish hook fast at the end of the extractor when operated according to the instructions given in this specification. The end of the internal member terminates in points 33 and 34, which are two corners of a triangular notch in the member which may be considered to terminate at A. This first notch may be of other shape than triangular but the three-sided structure is preferable because of greater ease of manufacture and superior operational characteristics. In the side of this first, usually larger triangle, spaced inwardly and extending sidewardly toward the side of the inner member near the tapered portion of the outer longitudinal members, is another triangular notch determined by points 35, 36 and B and intersecting the first triangle at 37. In combination the triangular notches form an opening in the internal member in which a fish hook 38 can be forced into the inwardmost angle to 35 with the bight of the hook 41 at 35 and the point 39 and shank 42 of the hook pointing toward the extractor handle, the internal member being held forward by thumb or finger pressure. Upon relaxation of that pressure and continued urging forward of the extractor and external members thereof, the tapered inner member will remain substantially in place and the outer parts will move forward, the tapered portion thereof forcing the fish hook to apex 36 of notch B—36—35 where it will be held firmly between the angle and the taper. The instrument holds the hook so tightly that it can be easily worked gently out of the fish part in which barb 40 is held.

In operation the extractor is held in one hand and the fish is held, pinned or steadied with the other. With the thumb or finger of the hand grasping the extractor pressing engagement means 30 forward to the limit the extractor is moved forward so that the inner part of the bight of the hook is in contact with the inwardmost part of the notch at 35. It is highly preferred in most instances to orient the hook so that the shank and point thereof are aimed back at the handle. If the hook is held so that such orientation is difficult, exertion of a little extra force will often cause the hook to turn to the desired position. When the hook has been swallowed or is otherwise embedded hidden in the fish the extractor is held with the inner member in forward position probing for the hook bight. The full breadth of the extractor is useful in probing for the hook and the sides of the first notch guide the hook, once located, to the point 35. The points 33 and 34 facilitate advancing the extractor internal member through the fish mouth and throat to the place where the hook is lodged. If the bight of the hook is held so close to the part of the fish where the hook is held fast that the first, larger notch apex 35 cannot contact the bight, additional pressure on the extension 30 of the internal member will force the ends 33 and 34 into the fish and will allow the bight to advance to the notch apex. Although pointed, ends 33 and 34 are not, for safety's sake, sharpened to cutting edges, except in comparatively rare instances. Nevertheless, should the fish hook be very difficult to remove the extractor may be worked from side to side to both loosen the hook and also to cut away that part of the fish in which the hook is embedded. If cutting is to be avoided the extractor may be alternatively twisted to work the hook free, the points 33 and 34 being used alternately as fulcrums.

The flat strip construction of the present fish hook extractor gives these devices advantages which make it a much more valuable article than other extractors. The strength of the width of metal which can be used enables the production of an instrument of considerable strength which is adapted to extract fish hooks of a wide variety of sizes. Using the flat strip construction, the opening between point 37 and side 34—35 can be made of size sufficient to accommodate large hooks and the distance between 36 and the side of the internal member will be great enough to resist bending or breaking under gripping pressure. This strong construction can be obtained with the use of a minimum amount of metal in its most economical fabricated form. The thin wall construction of the strip members also allows the holding of fish hooks very firmly with a minimum of strain on the hook. Even when relatively small hooks having bights of low radii of curvature are to be extracted the closeness of the gripping surfaces of the internal and external members causes only a relatively flat part of the hook to be held. There is therefore little bending of the hook at the bight and no danger of snapping the hook in two or distorting it.

The three-point gripping action of the notch of the internal member having its apex at 38 and the tapered external members provides positive engagement of the hook and extractor when the internal member is pulled back. The triangular notch 35—38—37 allows no movement or play of the hook when the tapered external member urges the hook bight to apex 38. This permits working the hook free with relative ease.

The flat strip construction of the extractor allows it to be cleaned and lubricated with little difficulty. The sliding surfaces are visible to the user and rust or foreign matter can be removed by a thin blade, emery cloth or other suitable substance inserted between the members and worked back and forth. Stainless steel and other hard alloy steels that may be employed do not rust but do require periodic lubrication to keep them operating smoothly. Another advantage of the strip construction, not previously mentioned, is that by twisting the extractor after insertion into the fish mouth the mouth can be held open by the width of the extractor, permitting a good view of the hook in many cases.

The present invention has been described with particular reference to a preferred embodiment thereof. It is obvious to one of skill in the art to which it pertains that modifications of the device shown may be made without departure from the spirit of the invention or going beyond the purview of the claims. As illustrative of other such embodiments of the invention may be mentioned those extractors wherein the external members are notched and the internal members are tapered. With these devices the tapered internal member must be urged forward to engage the hook positively. However, analysis of the movements of the elements reveals that the relative motion of these components is the same as in the extractor illustrated in the drawing. Another equivalent extractor within the scope of the invention is one closely resembling the described device but wherein the internal member has only one pointed portion at the forward end, the line 36—35 being extended through 35 to the side of the extractor. In such a device the external members are tapered more sharply so that the extension of side 26—24 acts as another directing surface aiding in leading the hook to notch at 35. Among other constructions of the invented extractor is that having another thumb or finger engaging element opposite to that at 30. In such an embodiment the thumb may be used to conveniently push the inner member forward before grasping the hook and the other opposite member may be pulled back hard to very firmly grip the bight of the hook before manipulation and release. Similarly, other equivalents of the invention will occur to those skilled in the art.

What is claimed is:

1. A fish hook extractor comprising a pair of opposed flat elongated external members and an elongated flat internal member held between and connected to the external members in limited reciprocably and longitudinally slidable relationship therewith, the internal member having at its end a notch opening extending from the sides of the internal member at the end thereof inwardly to a point of joinder, and, spaced inwardly from the end of the internal member and extending sidewardly, another notch in the side of the first opening, and the external members being tapered from the end thereof toward one side in such a manner that when the external members are moved forward relative to the internal member, tapered end first, the bight of a fish hook in the joinder of the sides of the first notch opening will be forced by the tapered external member into the other, sidewardly extending notch where it will be held tightly between the tapered external members and the wall of the sidewardly extending notch.

2. A fish hook extractor comprising a pair of opposed flat elongated external members and an elongated flat internal member held between and connected to the external members in limited reciprocably and longitudinally slidable relationship therewith, the internal member having at its end a triangular notch opening extending from the sides of the internal member at the end thereof inwardly to a point of intersection, and, spaced inwardly from the end of the internal member and extending sidewardly, another triangular notch in a side of the first opening, and the external members being tapered from the end thereof toward one side in such a manner that when the external members are moved forward relative to the internal member, tapered end first, the bight of a fish hook in the intersection of the sides of the first triangular notch opening will be forced by the tapered external members into the sidewardly extending triangular notch where it will be held tightly between the tapered external members and the angle formed by walls of the sidewardly extending triangular notch.

3. A fish hook extractor comprising a pair of opposed flat elongated external members and an elongated flat internal member held between and connected to the external members in limited reciprocably and longitudinally slidable relationship therewith, the internal member having at its end a triangular notch opening extending from the sides of the internal member at the end thereof inwardly to a point of intersection, and, spaced inwardly from the end of the internal member and extending sidewardly, another smaller triangular notch in a side of the larger triangular opening formed by partially superimposing on the larger triangular opening a smaller triangular opening, one of the sides of which is partly in common with a side of the larger triangle and partly an extension thereof, and the external members being tapered from the end thereof to one side in such a manner that when the external members are moved forward relative to the internal member, tapered end first, the bight of a fish hook in the intersection of the sides of the larger triangular notch opening will be forced by the tapered external members into the sidewardly extending triangular notch where it will be held tightly between the tapered external members and the angle formed by the walls of the smaller triangular notch.

4. A fish hook extractor comprising a pair of opposed thin flat elongated external members having a common handle portion at one end and an elongated thin flat internal member held between and connected to the external members in limited reciprocably and longitudinally slidable relationship therewith, the internal member having near the handle means for thumb or finger engagement and at its opposite end a triangular notch opening extending from the sides of the internal member at the end thereof inwardly to a point of intersection, and, spaced inwardly from the end of the internal member and extending sidewardly, another smaller triangular notch formed by partially superimposing on the larger triangular opening a smaller triangular opening, one of the sides of which is partly in common with a side of the larger triangle and partly an extension thereof, and the external members being tapered from the end thereof to one side in such a manner that when the internal member is held forward relative to the external members by force of finger or thumb of the hand grasping the handle on the means for finger or thumb engagement and the extractor is forced forward so that the bight of a fish hook held in a fish is forced into the larger notch to the intersection of the sides thereof, tending to turn the fish hook so that the barbed end and shank of the hook point to the extractor handle, the external member, when thumb or finger pressure is relaxed, will move forward, tapered end first, forcing the bight of the fish hook into the sidewardly extending triangular notch where it will be held tightly between the tapered external members and the angle formed by walls of the smaller triangular notch by thumb or finger force pulling the internal member to the handle, so that the fish hook, being positively held even when the bight is of small radius of curvature, can be worked loose of the fish and withdrawn therefrom easily without re-engaging hook barb and fish flesh.

References Cited in the file of this patent

UNITED STATES PATENTS

| | | |
|---|---|---|
| 1,199,705 | Lucas et al. | Sept. 26, 1916 |
| 1,777,695 | Jeffery | Oct. 7, 1930 |
| 2,512,818 | Wikarski | June 27, 1950 |
| 2,836,003 | Schumacker | May 27, 1958 |